D. KOPS.

APPAREL CORSET.

APPLICATION FILED MAR. 19, 1921.

Reissued June 28, 1921.

15,134.

3 SHEETS—SHEET 1.

INVENTOR
Daniel Kops
BY
HIS ATTORNEYS

D. KOPS.

APPAREL CORSET.

APPLICATION FILED MAR. 19, 1921.

Reissued June 28, 1921.

15,134.

3 SHEETS—SHEET 2.

INVENTOR
Daniel Kops
BY
HIS ATTORNEYS

D. KOPS.

APPAREL CORSET.

APPLICATION FILED MAR. 19, 1921.

Reissued June 28, 1921.

15,134.

3 SHEETS—SHEET 3.

INVENTOR

Daniel Kops

BY

HIS ATTORNEYS

UNITED STATES PATENT OFFICE.

DANIEL KOPS, OF NEW YORK, N. Y.

APPAREL-CORSET.

15,134. Specification of Reissued Letters Patent. Reissued June 28, 1921.

Original No. 1,366,811, dated January 25, 1921, Serial No. 404,607, filed August 19, 1920. Application for reissue filed March 19, 1921. Serial No. 453,749.

*To all whom it may concern:*

Be it known that I, DANIEL KOPS, a citizen of the United States, residing in the borough of Manhattan, city, county, and State of New York, have invented Improvements in Apparel-Corsets, of which the following is a specification.

This invention relates to an apparel corset and more particularly to a corset garment which is so constructed as to be adapted for use as a maternity corset, and also a corset which may be worn after confinement to assist in returning the body to a normal condition, and when used at the latter time and for the purpose stated also makes the nursing of the child readily possible without removing the garment from the body. I am aware that heretofore various forms of maternity corsets have been constructed to provide for the adjustment of the parts thereof in an effort to support the body of the wearer during pregnancy, but so far as these have come to my knowledge the adjustments of the garment have been made in the lower front portions thereof and consequently have not correctly or adequately served their intended purpose. It is a generally recognized fact that at about the fourth month of pregnancy and thereafter the uterus becomes an abdominal rather than a pelvic organ rising from behind the symphysis pubis into the abdominal cavity. Naturally after the uterus leaves the pelvic cavity and enters the abdominal cavity and becomes distended there is a considerable tension upon the broad ligaments and associated abdominal and pelvic organs and the abdominal walls become distended and tense. While these and other changes take place in the abdominal walls and the soft tissues thereof, the bony pelvic section of the body remains practically unchanged and this portion of the figure therefore is substantially constant, that is the distance between the crests and the spines of the ilia remains substantially permanent.

It will therefore be understood that the abdominal section of the body, rather than the pelvic section thereof, is the part which requires support during the period of pregnancy, and the corset made in accordance with my present invention is therefore constructed to conform to the figure from the central hip section forward to substantially the medial line of the symphysis pubis following along the outline of the bony pelvis so that the garment at the groin section is fixed and non-adjustable. To provide the necessary adjustment and support for the distended abdominal section of the body the corset made in accordance with this invention is constructed to include a front strap that extends across the abdominal section and is adapted to coact with the lower fixed pelvic section of the garment as hereinbefore described to form a sling which serves as a support for the distended abdominal section of the body. As the increasingly distended uterus approaches the region of the umbilicus the top elastic portion of the strap is moved outward by the correspondingly distended abdominal portions of the body so that there results a space in the garment to accommodate the downwardly increasing distended condition of the uterus. Eventually, the abdominal distention of the body becomes so great that it reaches the end of the sternum and as a result this space in the garment is completely filled. It consequently follows that the lower portion of the garment being made to hug the groin section more closely and coacting with the adjustable upper front portion provides the necessary amount of support for the distended abdominal section of the body where the same is most needed.

In order to provide sufficient space when needed for the proper adjustment of the garment the upper side sections of the corset made in accordance with the invention may be fitted with adjustable lacing devices. These are made adjustable to a sufficient extent to more than provide for the normal distention of the body and also serve the purpose of adjusting the garment to position after confinement in order to assist in returning the body to its normal condition, and the front strap to which reference has hereinbefore been made is so connected in the garment that it may be removed or partially removed to readily permit the mother to nurse the child without removing the garment from the body. Together with the purposes hereinafter indicated the object of the invention, broadly, is to provide a garment, in the use of which it is possible to properly support the body of the wearer during pregnancy without producing undue or unnecessary pressure thereon, and the corset made in accordance with my invention will be hereinafter more particularly described.

Figure 1:
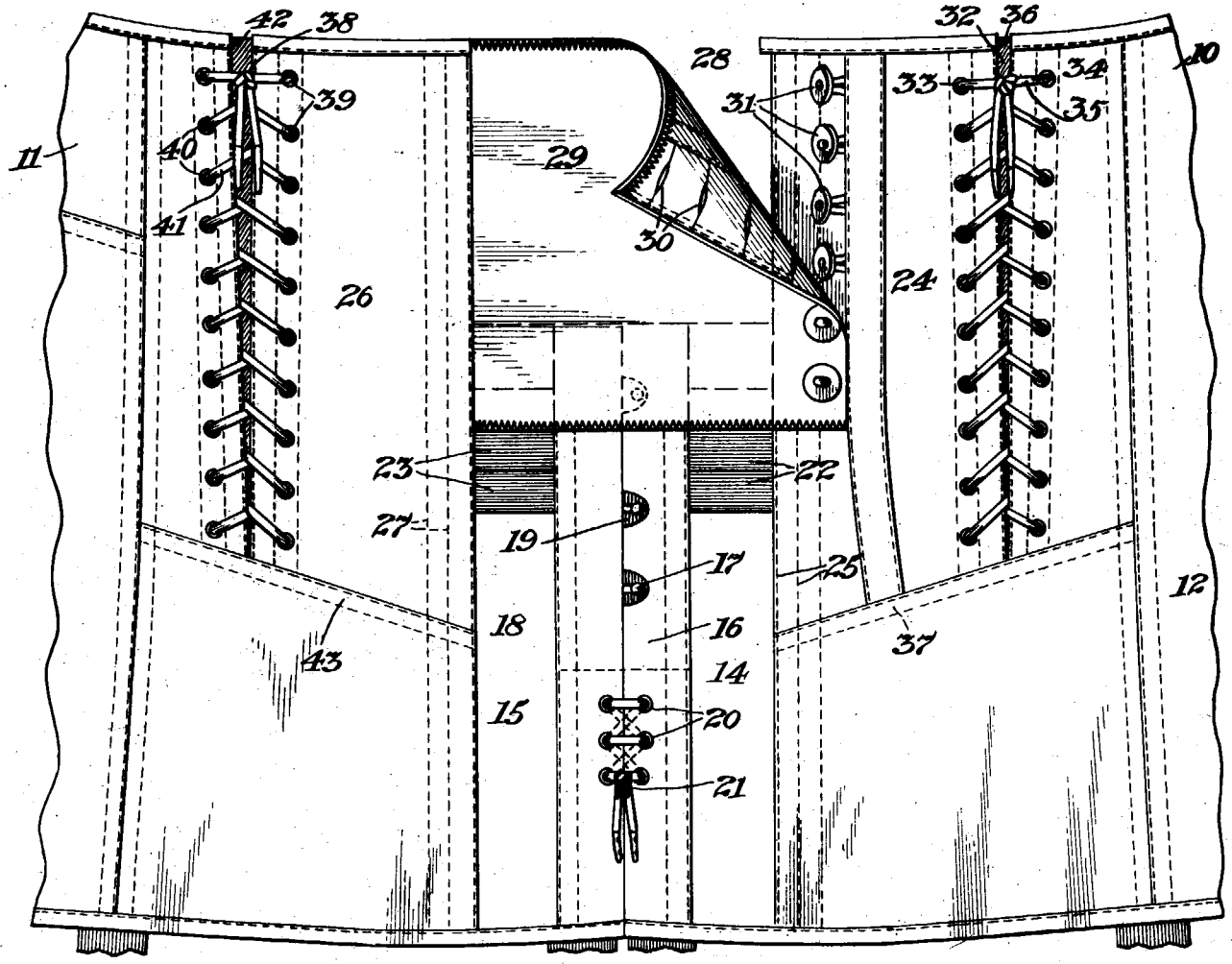
Figure 1 is an elevation of the front portion of my improved apparel corset.
Figure 2:
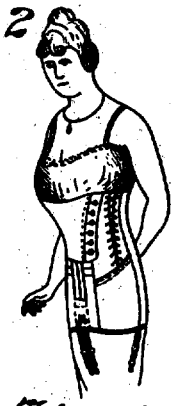
Fig. 2 is a perspective view on a small scale of a corset garment made in accordance with my present invention.
Figure 3:
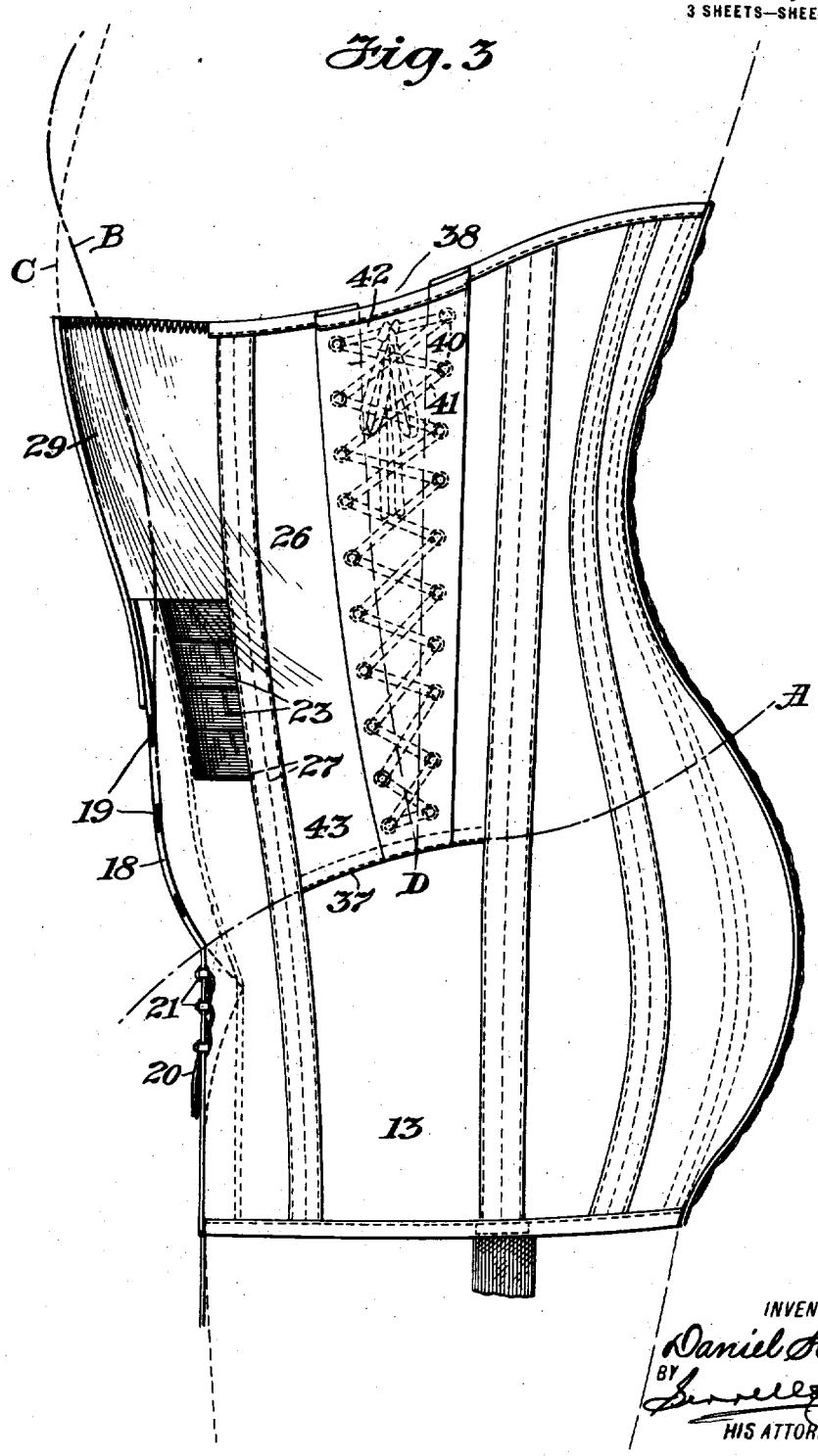
Fig. 3 is an elevation of the inner side of one of the corset parts showing the manner in which the same conforms to the body of the wearer.

Referring to the drawing, and particularly to Figs. 1, 2 and 3, the corset made in accordance with this invention preferably consists of corset body halves, the parts of which are designated at 10 and 11. At the rear the corset body halves, as is usual, are provided with series of eyelets along the edges to receive the customary laces; and also each corset body half is preferably fitted with skirt members which, respectively, are designated by 12 and 13.

In this garment there are also employed front steel portions, in each of which there is a front steel. The front steel portion on the left side of the garment is indicated at 14 and that on the right side at 15. In the former the front steel is indicated at 16 and is provided with series of studs 17, while the front steel in the other front steel portion is indicated at 18 and it fitted with a corresponding number of socket members 19 adapted to engage with the studs 17 to connect these parts of the garment, as also is customary. The skirt sections of the garment extend preferably to the front medial edges thereof, and below the lower ends of the front steels may be provided with eyelets 20 adapted to receive the adjusting laces 21, as clearly indicated in Fig. 1, although, as will be understood, these eyelets may be dispensed with and no lacing device here employed.

Each front steel is so placed in the garment that the lower end thereof lies approximately at the front central section of the groin of the wearer and extends upwardly overlying the front portions of the abdomen and terminating at a point which lies approximately over the upper abdominal section of the body of the wearer, and in the upper portions thereof each front steel part of the garment preferably includes series of tapes 22 and 23 extending from the front steel pockets to the edges of the front body portions of the garment. The front body portion of the garment in the left corset body half is indicated at 24 and the front edge thereof is connected to the front steel portion 14 and the tapes 22 thereof along lines of stitching indicated at 25. Similarly the front body portion in the right corset body half is indicated at 26 and the front edge of the same is connected to the front steel portion 15 and the tapes 23 thereof along the lines of stitching 27. This construction is such that above the front steel portions and between the front edges of the body portions of the garment there is a space indicated at 28. Extending across this space 28 I employ a front strap 29. As indicated in this form of the invention this front strap is preferably made of elastic webbing or other similar yielding material and at one edge is secured in the front edge of the front body member 26 along the lines of stitching 27, and at the opposite edge is provided with a series of button holes 30 adapted to be engaged by the buttons 31 secured to the front body portion 24 adjacent the front edge thereof. This front strap 29 also preferably extends from the upper edge of the garment to a line appreciably below the upper ends of the front steel portions so that the lower part of the front strap overlaps the upper ends of the front steels and the front steel portions when in place on the body of the wearer.

In order to provide for further adjustability in the garment, the front body portions thereof may be divided and fitted with laces or other similar adjusting devices. For example, as shown in Fig. 1, the front body portion 24 is divided as indicated at 32 and the adjacent edges provided with series of eyelets 33 and 34 which are fitted with laces 35. This divided portion of the front body member may also be fitted with a tongue 36 suitably secured at the inner side of the garment and adapted to overlie the divided portion thereof and the laces connecting the same. Furthermore, this division in the front body member preferably extends from the upper edge of the garment to the groin section thereof, or to a band 37 secured in the garment and so placed as to extend along the line of the groin of the wearer. Similarly the front body member 26 is divided as indicated at 38 and the adjacent edges fitted with eyelets 39 and 40 to receive a lace 41 for adjusting the parts to position. This divided portion of the garment is also fitted with a tongue 42 fixed in the inner side of the corset and adapted to overlie the line of division and the laces connecting the same. The divided part in this portion of the garment also extends from the upper edge thereof to a band 43 suitably fixed in the garment and corresponding to the band 37 so as to extend along the groin section of the body of the wearer.

Referring particularly to Fig. 3 it will be seen that the garment along the groin section, as indicated by the dotted line A, is substantially fixed and is not adjustable. Furthermore, that under practically normal conditions, with the adjusted sections of the garment drawn together, the corset assumes, in the front portion thereof the position as shown by the dotted and dash line B, while when in an adjusted position the front portion above the groin section may be moved outwardly or inwardly, as for example outwardly, to assume a position as indicated by the dotted line C. Also as the adjusting devices extend from the top of the garment or its upper edge to a point along or in the groin section as indicated at D, the front portion of the garment above the groin section may be adjusted inwardly or outwardly by the adjustment of these lacing devices so that the points D at the sides of the garment are the pivotal points on which the front parts of the garment move either inwardly or outwardly to effect the necessary adjustment of the corset to adapt the same to various conditions of the body.

Figure 4:
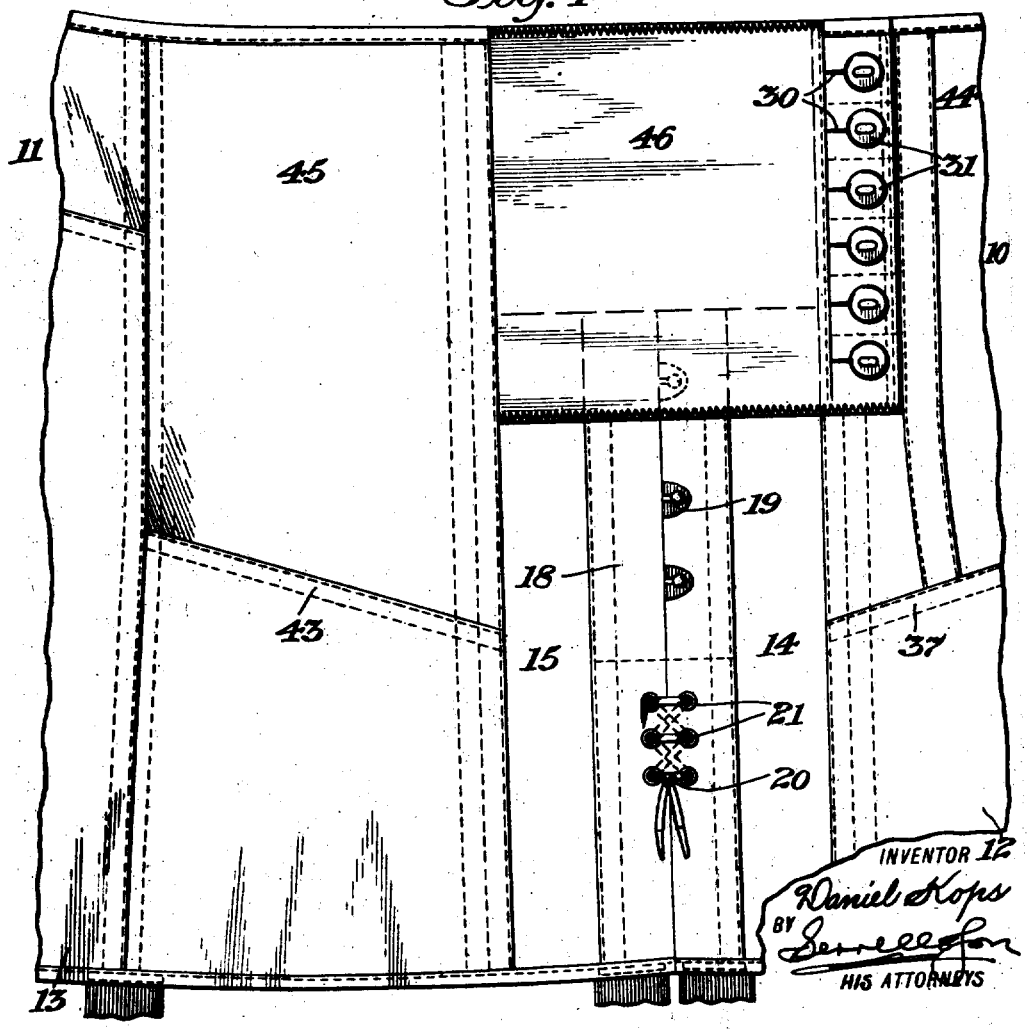
Fig. 4 is a view similar to Fig. 1 showing another form of the invention.

Referring to Fig. 4 it will be seen that the construction of the garment in this form of the invention is similar in all respects to that shown in Figs. 1 and 3 with the exceptions that the front body portions thereof, as indicated at 44 and 45, are not divided and provided with the laces for adjusting the same to position; and that the front strap 46 instead of being made of elastic webbing or other yielding material is made from a suitable inelastic fabric, and also by the omission of the straps 22 and 23, which in this form of the invention are not employed.

As will now be apparent, the garment as made in accordance with the invention, as hereinbefore described, is constructed to snugly fit the body of the wearer around the hip and groin section where the garment is fixed and not adjustable, whereas in the abdominal portions of the garment where the adjustment is necessary the corset is constructed not only to provide for this adjustment but also to properly and adequately support the body, the yielding front band providing for the initial adjustment and adequate tension, while the adjustable lacing devices at the side make the necessary further adjustments possible without in any way changing the yielding supporting features of the abdominal portions of the garment. Furthermore that after confinement the side adjustments of the garment may be employed to assist the body in returning to its normal configuration, and also that the front straps or band may be unbuttoned, making it possible to nurse the child without removing the garment from the body.

I claim as my invention:

1. In an apparel corset, front steel members adapted to extend from the groin section upwardly and to overlie portions of the abdominal section of the body of the wearer, front body members secured to the front steel members and extending appreciably above the same so that the forward edges of the front body members above the front steel portions are materially spaced from one another, and a front strap extending between the said spaced edges of the front body members.

2. In an apparel corset, front steel members adapted to extend from the groin section upwardly and to overlie portions of the abdominal section of the body of the wearer, front body members secured to the front steel members and extending appreciably above the same so that the forward edges of the front body members above the front steel portions are materially spaced from one another, and a front strap of yielding material extending between and connected to the adjacent spaced edges of the front body members.

3. In an apparel corset, front steel members adapted to extend from the groin section upwardly and to overlie portions of the abdominal section of the body of the wearer, front body members secured to the front steel members and extending appreciably above the same so that the adjacent edges of the front body members above the front steel portions are materially spaced from one another, and a front strap of yielding material secured along one edge to the edge of one front body member above the front steels and at the other edge detachably connected to the edge of the other front body member above the said front steels.

4. In an apparel corset, corset body halves adapted to unyieldingly conform to the groin section of the wearer, front steel members in each corset body half extending upwardly from the groin section so as to overlie the front central portions of the abdomen and to terminate over the upper portion of the abdominal section, and each front steel member being connected to the forward edge of the corresponding corset body half which extends appreciably above its front steel member leaving a space between the adjacent longitudinal edges of the corset body halves above the front steel members, and a front strap of yielding material secured along one edge to the forward edge of one corset body half above the front steel member thereof adapted to extend across the space between the said corset body halves at the front thereof and to be detachably connected to the other corset body half, with the lower part of said front strap overlapping the upper ends of the said front steel members.

5. In an apparel corset, front steel members extending from the groin section to the upper part of the abdominal section, front body members secured to the front steel members and extending appreciably above the same so that the adjacent edges of the front body members above the front steel portions are materially spaced from one another, a front strap extending between the said spaced edges of the front body members, and adjustable devices in the front body members on both sides of the said front strap extending only from the upper edge thereof to the groin section of the garment so that the front parts of the garment above the groin section may be adjusted to place.

6. In an apparel corset, front steel members extending from the groin section upwardly over the lower part of the abdominal section, front body members secured to the front steel members and extending appreciably above the same so that the adjacent edges of the front body members above the front steel portions are materially spaced from one another, a front strap of yielding material secured along one edge to the edge of one front body member above the front steels and at the other edge detachably connected to the edge of the other front body member above the said front steels, and adjustable devices in the front body members on both sides of the said front strap extending only from the upper edge thereof to the groin section of the garment.

7. In an apparel corset, corset body halves adapted to unyieldingly conform to the groin section of the wearer, front steel members in each corset body half extending upwardly from the groin section over the lower front portion of the abdominal section and terminating over the upper abdominal section, and each front steel member being connected to the forward edge of the corresponding corset body half which extends appreciably above its front steel member leaving a space between the adjacent longitudinal edges of the corset body halves above the front steel members, a front strap of yielding material secured along one edge to the forward edge of one corset body half above the front steel member thereof adapted to extend across the space between the said corset body halves at the front thereof and to be detachably connected to the other corset body half, with the lower part of said front strap overlapping the upper ends of the said front steel members, and adjustable devices in each corset body half at the sides of the said front strap and extending only from the upper edge to the groin section of the garment so that the front parts of the garment above the groin section may be adjusted outwardly or inwardly to place.

Signed by me this 8th day of March, 1921.

DANIEL KOPS.